United States Patent [19]
Partain et al.

[11] 4,106,735
[45] Aug. 15, 1978

[54] ADJUSTABLE COIL RACK

[76] Inventors: Wilbur A. Partain, 415 Illinois Ave.; Frank D. Sudol, 1124 Logan Ave., both of Mc Donald, Ohio 44437

[21] Appl. No.: 805,828

[22] Filed: Jun. 13, 1977

[51] Int. Cl.² .............................................. B60P 7/00
[52] U.S. Cl. ................. 248/119 R; 211/43; 105/367; 248/316 R
[58] Field of Search ............... 248/119 R, 352, 316 R, 248/316 A, 316 C, 316 E, 172; 211/43, 175; 403/375, 393; 105/367

[56] References Cited

U.S. PATENT DOCUMENTS

| | | | |
|---|---|---|---|
| 525,186 | 8/1894 | Bowley | 248/119 R |
| 1,247,938 | 11/1917 | Curtenius | 403/375 |
| 2,061,937 | 11/1936 | Fay | 211/43 |
| 2,364,482 | 12/1944 | Seiler | 211/43 |
| 2,684,765 | 7/1954 | Lowenstein | 211/43 |
| 3,299,989 | 1/1967 | Santosuosso | 248/119 R |
| 3,460,684 | 8/1969 | Almasy | 105/367 |
| 3,472,363 | 10/1969 | Rustin et al. | 248/119 R |
| 3,876,173 | 4/1975 | Cline | 248/119 R |
| 3,912,139 | 10/1975 | Bowman | 248/119 R |

*Primary Examiner*—Robert A. Hafer
*Attorney, Agent, or Firm*—Webster B. Harpman

[57] ABSTRACT

An adjustable anti-rolling shipping rack for steel coils consists of a metal body flanged on its longitudinal edges and having a plurality of apertures inwardly of its ends adjustably receives a pair of secondary metal body members in oppositely disposed relation, each of which have upstanding triangular abutments on their outermost ends and offset portions on their inner ends engagable in said apertures.

4 Claims, 4 Drawing Figures

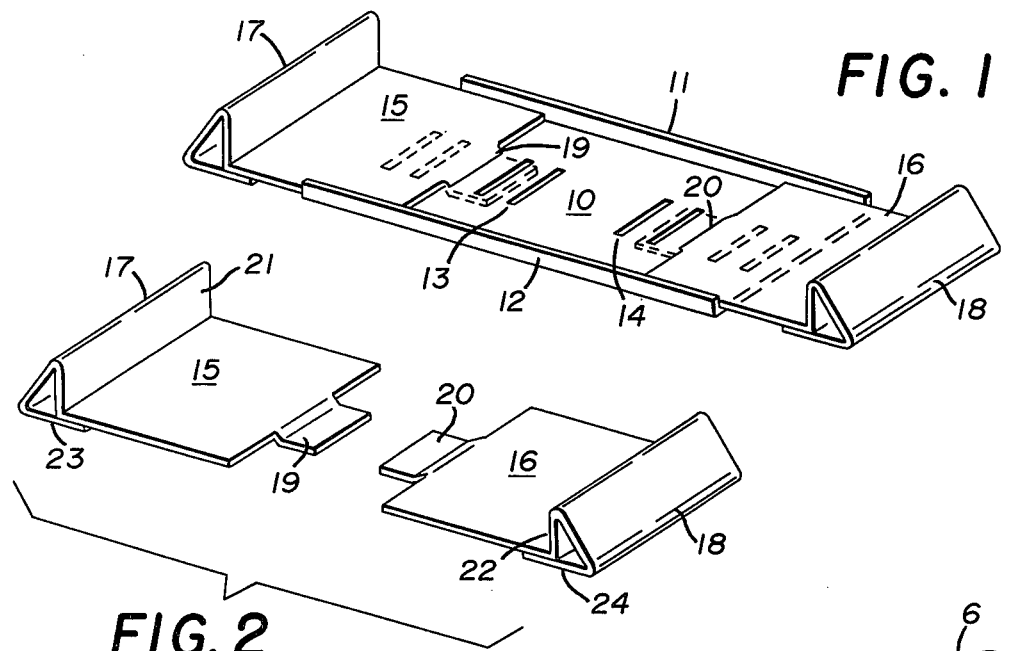
FIG. 1
FIG. 2
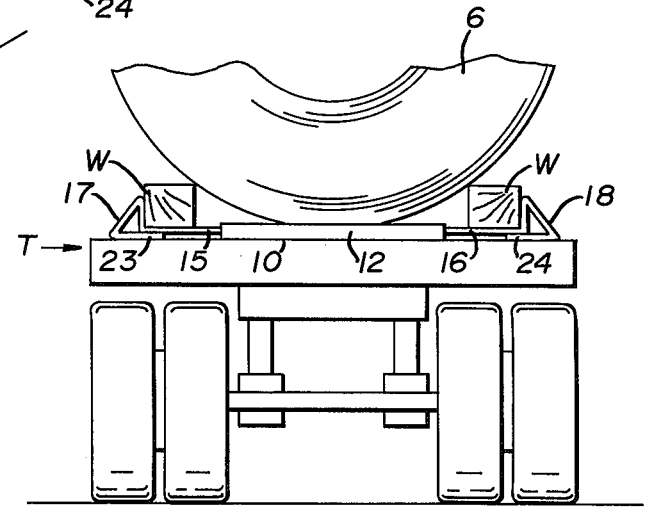
FIG. 3
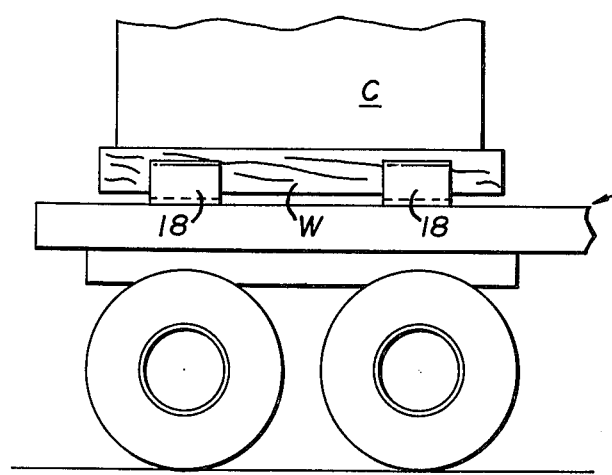
FIG. 4

ADJUSTABLE COIL RACK

BACKGROUND OF THE INVENTION (1) Field of the Invention

This invention relates to coil racks such as used on flat bed trucks for receiving and holding coils of steel strip and the like.

(2) Description of the Prior Art

Prior coil racks have generally comprised elongated members with triangular abutments of their opposite ends as seen in U.S. Pat. No. 3,876,173. A pair of these devices provided with two or more wooden members receives and holds a coil of steel against rolling. When the coils of steel are of lesser diameter than the space between the fixed abutments and the pair of wooden members additional wooden members must be employed to adquately engage the coils. The present invention makes the coil rack itself adjustable.

Other prior art patents which disclose racks for supporting shipping cases and vehicle wheel blocks includes U.S. Pat. Nos. 525,182; 833,454; 770,510; 1,047,048 and 2,870,872. None of these patents disclose a structure adjustable lengthwise and none of them suggest a device such as disclosed herein.

SUMMARY OF THE INVENTION

An adjustable coil rack comprises a metal body having upstanding flanges on its longitudinal edges for movably receiving a pair of oppositely disposed secondary metal body members, each of which has an upstanding triangular abutment at its outermost end. A plurality of transversely extending slot-like apertures in the metal body receives offset portions on the inner oppositely disposed ends of the secondary body members to removably secure the secondary metal body members in adjusted relation thereto.

A pair of the adjustable coil racks positioned on a supporting surface and provided with a pair of wooden members cross ways thereof suitably engage and support a coil positioned therebetween.

DESCRIPTION OF THE DRAWINGS

FIG. 1 is a perspective view of the adjustable coil rack;

FIG. 2 is a composite view showing the two end portions of the coil rack of FIG. 1;

FIG. 3 is an end elevation of a truck or a trailer showing the adjustable coil rack thereon supporting a steel coil; and FIG. 4 is a side view of the coil and coil rack seen in FIG. 3.

DESCRIPTION OF THE PREFERRED EMBODIMENT

In the form of the invention chosen for illustration herein the adjustable coil rack comprises, as may best be seen in FIG. 1 of the drawings, a metal body member 10 preferably rectangular and having upstanding flanges 11 and 12 on its longitudinal edges. A plurality of slot-like apertures 13 and 14 are positioned inwardly of the opposite ends of the metal body 10 and spaced with respect to one another. The slot-like apertures 13 are arranged in one group and the slot-like apertures 14 are arranged in a second group. A pair of identically formed secondary body members 15 and 16 are positioned on the end portions of the body member 10 and extending outwardly therefrom and each is provided with an upstanding triangular abutment 17 and 18 respectively. The inner ends of the secondary body members 15 and 16 are each provided with an offset tongue 19 and 20 respectively, the tongues 19 and 20 being engagable in the slot-like apertures 13 and 14.

As illustrated in FIG. 1 of the drawings the tongues 19 and 20 are shown engaged in the respective slot-like apertures 13 and 14 at their point of offset with respect to the plane of the secondary body members 15 and 16 so that they generally underlie portions of the body member 10. The secondary body members 15 and 16 are of a width to engage the body member 10 and be movable thereon relative to the upstanding flanges 11 and 12.

In FIG. 2 of the drawings, the secondary body members 15 and 16 are illustrated in perspective view and the arrangement and offset formation of the tongues 19 and 20 may be seen.

Still referring to FIGS. 1 and 2 of the drawings, it will be seen that the upstanding triangular abutments 17 and 18 are preferably formed by bending the metal of the secondary body members 15 and 16 upwardly to form perpendicular end walls 21 and 22 and then bending the metal of the secondary body members downwardly on an angle and then in a reverse bend positioning the actual end portions of the body members 15 and 16 in under the planar sections thereof, the end portions being indicated at 23 and 24 and they are welded to the planar portions of the metal body members 15 and 16. It will thus be seen that the end portions 23 and 24 and the offset tongues 19 and 20 are on substantially the same planes spaced just below the plane of the secondary body members 15 and 16.

By referring now to FIGS. 3 and 4 of the drawings, it will be seen that a portion of a flat bed of a truck or a trailer is indicated by the letter T and that a pair of the adjustable coil racks of the present invention are illustrated in operative position thereon. In FIG. 3 the body member 10 is positioned transversely of the flat bed T and the secondary body members 15 and 16 are engaged therein as hereinbefore described to space the upstanding triangular abutments 17 and 18 a desired distance apart. Wooden members W are positioned on the secondary body members 15 and 16 in abuting relation to the upstanding triangular abutments 17 and 18 and a coil of steel strip C is positioned between the wooden members and resting on the adjustable coil racks which are thereby held in adjusted position by the weight of the coil C. Those skilled in the art will observe that conventional chains and tensioning fasteners are then applied to the coils C and secured to the flat bed of the truck or trailer T.

It will thus be seen that an adjustable coil rack has been disclosed which can be easily and quickly adjusted as to length so as to approximately match the diameter of a coil of steel or the like to be supported thereby and held against rolling etc.

It will further be seen that the adjustable coil rack may be more easily handled than the coil racks heretofore known in the art as its individual pieces are smaller and lighter and therefore more readily portable than the prior art devices. Several adjustable coil racks are usually used on one truck or trailer in handling several coils of steel, and they can be positioned in the cab of the truck or tractor pulling the trailer for the return to the mill.

Although but one embodiment of the present invention has been illustrated and described, it will be apparent to those skilled in the art that various changes and modifications may be made therein without departing from the spirit of the invention and having thus described our invention what we claim is:

1. An adjustable coil rack for the anti-rolling support of steel coils comprising a flat rectangular body member having upstanding longitudinally extending flanges on its longitudinal edges, said body member having a plurality of spaced transversely extending slot-like apertures axially thereof and inwardly of the ends thereof and a pair of secondary flat body members having offset tongues on one of each of of their ends engaged in two of said slot-like apertures so that said offset tongues underlie portions of said flat rectangular body member to secure said secondary body members in spaced relation on said flat rectangular body member, upstanding abutments on the opposite ends of each of said secondary body members.

2. The adjustable coil rack set forth in claim 1 and wherein the plurality of apertures are arranged in two groups spaced with respect to the center portion of said body member.

3. The adjustable coil rack set forth in claim 1 and wherein the upstanding abutments are substantially triangular.

4. The adjustable coil rack set forth in claim 1 and wherein the upstanding abutments each include a perpendicular wall portion having an outwardly and downwardly extending section and a return section underlying a portion of said secondary body member.

* * * * *